(12) United States Patent
Zuckerman et al.

(10) Patent No.: US 12,450,462 B2
(45) Date of Patent: *Oct. 21, 2025

(54) METHOD FOR ENABLING FINGERPRINT AUTHENTICATION FOR A SMART CARD

(71) Applicant: Fingerprint Cards Anacatum IP AB, Gothenburg (SE)

(72) Inventors: Haran Zuckerman, Skaevinge (DK); Anders Ø. Nielsen, Frederiksberg C (DK); Peter Bjørn-Jørgensen, Roskilde (DK)

(73) Assignee: Fingerprint Cards Anacatum IP AB, Göteborg (CH)

( * ) Notice: Subject to any disclaimer, the term of this patent is extended or adjusted under 35 U.S.C. 154(b) by 282 days.

This patent is subject to a terminal disclaimer.

(21) Appl. No.: 18/032,687

(22) PCT Filed: Oct. 26, 2021

(86) PCT No.: PCT/SE2021/051077
§ 371 (c)(1),
(2) Date: Apr. 19, 2023

(87) PCT Pub. No.: WO2022/093100
PCT Pub. Date: May 5, 2022

(65) Prior Publication Data
US 2023/0385587 A1    Nov. 30, 2023

(30) Foreign Application Priority Data

Oct. 29, 2020    (SE) .................................. 2051258-8
Jun. 22, 2021    (SE) .................................. 2150802-3

(51) Int. Cl.
*G06Q 20/40*    (2012.01)
*G06F 21/32*    (2013.01)
(Continued)

(52) U.S. Cl.
CPC ......... *G06K 19/0718* (2013.01); *G06F 21/32* (2013.01); *G06F 21/34* (2013.01);
(Continued)

(58) Field of Classification Search
CPC ..... G06K 19/0718; G06F 21/32; G06F 21/34; G06Q 20/204; G06Q 20/352;
(Continued)

(56) References Cited

U.S. PATENT DOCUMENTS 7,078,603 B2    7/2006    Henry et al.
7,389,269 B1    6/2008    Robinson et al.
(Continued)

FOREIGN PATENT DOCUMENTS

EP    1290632 B1    8/2010
EP    2011057 B1    8/2010
(Continued)

OTHER PUBLICATIONS

"Adoption of Biometric Fingerprint Identification as an Accessible, Secured Form of ATM Transaction Authentication." International journal of advanced computer science & applications (2015): n. pag. Web. (Year: 2015).*

(Continued)

*Primary Examiner* — Ashford S Hayles
(74) *Attorney, Agent, or Firm* — RMCK Law Group, PLC (57) ABSTRACT

The present disclosure relates to a method for progressively enrolling a user of a smart card to thereafter enable fingerprint authentication for the smart card. The present disclosure also relates to a corresponding smart card and to a computer program product.

14 Claims, 3 Drawing Sheets

(51) Int. Cl.
*G06F 21/34* (2013.01)
*G06K 19/07* (2006.01)
*G06Q 20/20* (2012.01)
*G06Q 20/34* (2012.01)

(52) U.S. Cl.
CPC ......... *G06Q 20/204* (2013.01); *G06Q 20/352* (2013.01); *G06Q 20/40145* (2013.01)

(58) Field of Classification Search
CPC ........... G06Q 20/40145; G06Q 20/341; G06V 40/1365; G06V 10/761
See application file for complete search history.

(56) References Cited

U.S. PATENT DOCUMENTS

| | | | |
|---|---|---|---|
| 7,778,935 B2 | 8/2010 | Colella | |
| 9,928,355 B2 | 3/2018 | Boshra | |
| 10,146,981 B2* | 12/2018 | Sezan | G06V 40/13 |
| 10,216,977 B2 | 2/2019 | Tse | |
| 11,288,678 B2 | 3/2022 | Almers et al. | |
| 2001/0048025 A1* | 12/2001 | Shinn | G06Q 20/341 235/382 |
| 2002/0095587 A1 | 7/2002 | Doyle et al. | |
| 2004/0034784 A1* | 2/2004 | Fedronic | G06Q 20/341 713/186 |
| 2004/0088562 A1* | 5/2004 | Vassilev | G06Q 20/3552 726/20 |
| 2004/0234117 A1* | 11/2004 | Tibor | G07F 7/04 382/137 |
| 2005/0139685 A1 | 6/2005 | Kozlay | |
| 2008/0013808 A1* | 1/2008 | Russo | G06V 40/1347 382/125 |
| 2011/0240748 A1* | 10/2011 | Doughty | G07F 7/0806 235/492 |
| 2013/0272586 A1 | 10/2013 | Russo | |
| 2013/0332353 A1* | 12/2013 | Aidasani | G06K 19/07762 705/41 |
| 2014/0210589 A1 | 7/2014 | Grace | |
| 2015/0286855 A1 | 10/2015 | Neskovic et al. | |
| 2016/0180146 A1 | 6/2016 | Setterberg et al. | |
| 2016/0203306 A1 | 7/2016 | Boshra | |
| 2016/0350574 A1 | 12/2016 | Weber et al. | |
| 2018/0137329 A1 | 5/2018 | Kim et al. | |
| 2018/0173920 A1 | 6/2018 | Jonsson et al. | |
| 2020/0005304 A1* | 1/2020 | Almers | G06Q 20/40145 |
| 2020/0026975 A1* | 1/2020 | Climen | G06F 21/45 |
| 2021/0042759 A1* | 2/2021 | Larsen | G06F 21/32 |

FOREIGN PATENT DOCUMENTS

| | | |
|---|---|---|
| EP | 3570239 A1 | 11/2019 |
| GB | 2531095 A | 4/2016 |
| GB | 2563599 A | 12/2018 |
| SE | 1750172 A1 | 8/2018 |
| WO | 0126549 A1 | 4/2001 |
| WO | 2008147457 A1 | 12/2008 |
| WO | 2014068090 A1 | 5/2014 |
| WO | 2016133554 A1 | 8/2016 |
| WO | 2016190803 A1 | 12/2016 |

OTHER PUBLICATIONS

Extended European Search Report dated Mar. 19, 2024 for European Application No. 21887042.6, 14 pages.
Maltoni, D. et al., "Handbook of Fingerprint Recognition, Chapter 9: Securing Fingerprint Systems," Jan. 2009, pp. 371-416.
Qun, R. et al., "Automatic Fingerprint Identification Using Cluster Algorithm," IEEE Comput. Soc, Aug. 2002, vol. 2, pp. 398-401.
Apple Inc., "iOS Security—White Paper," Oct. 2014, 50 pages.
EPO Communication Pursuant to Rule 114(2) EPC dated Feb. 27, 2020 for EP Application No. 18753747.7, 17 pages.
International Standard, ISO/IEC 24787—Information Technology—Identification Cards—On Card Biometric Comparison, Dec. 15, 2010, 45 pages.
PCT International Search Report and Written Opinion dated Jan. 21, 2022 for International Application No. PCT/SE2021/051077, 14 pages.
PCT International Search Report and Written Opinion dated Jun. 11, 2018 for International Application No. PCT/SE2018/050135, 14 pages.

* cited by examiner

METHOD FOR ENABLING FINGERPRINT AUTHENTICATION FOR A SMART CARD

CROSS-REFERENCE TO RELATED APPLICATIONS

This application is a 371 U.S. National Stage of International Application No. PCT/SE2021/051077, filed Oct. 26, 2021, which claims priority to Swedish Patent Application Nos. 2150802-3, filed Jun. 22, 2021 and 2051258-8, filed Oct. 29, 2020. The disclosures of each of the above applications are incorporated herein by reference in their entirety.

TECHNICAL FIELD

The present disclosure relates to a method for progressively enrolling a user of a smart card to thereafter enable fingerprint authentication for the smart card. The present disclosure also relates to a corresponding smart card and to a computer program product.

BACKGROUND

The use of biometric techniques to identify and/or authenticate the identity of a user is increasing. Biometric techniques that are promoted for this use include voice, fingerprint, iris, vein pattern and other scans. Currently, the use of fingerprint sensors for capturing a fingerprint has shown to be specifically promising, for example due to its ease of integration with different types of electronic equipment, such as smartphones, watches, tablets, or any other type of electronic devices where personalized user interaction is advantageous.

In the above typical prior-art examples of electronic equipment having an integrated fingerprint sensor, the electronic equipment is generally provided with some form of graphical user interface (GUI) for instructing the user on how to start using the functionality provided by means of the fingerprint sensor. For example, the GUI may be specifically adapted to instruct the user on how to enroll a finger for allowing future authentication of the user. However, there also exists electronic equipment that lacks a GUI for providing suitable instructions to the user during the enrollment process, such as a smart card having an integrated fingerprint sensor, for example to be used as an alternative to use of a PIN code. In such a case, the enrollment process must typically involve some form of further electronic equipment, at least to be used for providing instructions to the used during the enrollment of a fingerprint for the user.

An example of such a smart card enrollment process is disclosed in US20050139685, where for example a bank is functioning as an authority for issuing the smart card. Specifically, in US20050139685 the smart card is inserted into a smart card reader being arranged in communication with a computer having a dedicated security mechanism for enrolling the fingerprint of the user.

Using dedicated "enrollment equipment" as proposed in US20050139685 may possibly be costly to provide and support if and when the general population transition from PIN only smart cards to smart cards having integrated fingerprint sensors. In addition, it would be desirable to allow the enrollment process to be somewhat automated, meaning that the amount of manual clerical interaction for authenticating the user during the enrollment process is reduced. Accordingly, there seems to be room for further improvement in securely enrolling a fingerprint of a user with a smart card comprising an integrated fingerprint sensor, specifically from a perspective of cost and user interaction.

SUMMARY

In view of the above-mentioned security problems, it is an object of the present disclosure to provide a simplified method for enrolling a fingerprint of a user with a smart card comprising an integrated fingerprint sensor.

According to a first of the present disclosure, it is therefore provided a method for activating fingerprint authentication for a user of a smart card, the smart card comprising a fingerprint sensing system including a fingerprint sensor configured for capturing a fingerprint representation of a fingerprint pattern of a finger of the user, and processing circuitry connected to and configured to control the operation of the fingerprint sensing system, the method comprising the steps of receiving, at the processing circuitry, an indication that the smart card is in communication with an electronic transaction terminal, thereby initiating an individual transaction, acquiring, using the fingerprint sensor, a present fingerprint representation of a portion of the user's fingerprint, extracting, using the processing circuitry, present fingerprint features from the present fingerprint representation, forming a present set of fingerprint features, amending, using the processing circuitry, a fingerprint template stored at the smart card to comprise the present set of fingerprint features, determining, using the processing circuitry, a plurality of first similarity levels by mutually comparing the sets of fingerprint features comprised with the fingerprint template, deleting, using the processing circuitry, the set or sets of fingerprint features having first similarity levels being below a first predetermined threshold, and authenticate, using the processing circuitry, the individual transaction only if an authentication criterion is fulfilled, the fulfillment of the authentication criterion comprises determining that the fingerprint template holds at least a predetermined number of sets of fingerprint features.

By means of the present disclosure, it is possible to allow the enrollment of a user with e.g. a "new" smart card to be performed progressively, typically while the user is using his smart card using another type of authentication, such as authenticating individual transactions with an identity card or using a PIN code related to the smart card. Specifically, the present disclosure proposes a fingerprint activation process where portions of the user's fingerprint is captured over time (in conjunction with a plurality of consecutive transactions/sessions) and essentially in the background while the user for example is performing a normal payment process in conjunction with e.g. a POS terminal and using his PIN code to authenticate the individual transaction. That is, each time the user is to perform an individual transaction, such as for example to pay for a product in a shop, he will at the same time place his finger onto the fingerprint sensor, whereby a partial fingerprint representation of a portion of the user's fingerprint is acquired.

It should however be understood that the expression "electronic transaction terminal" should be interpreted in the broadest sense, meaning that the electronic transaction terminal could be any electronic device useful for interfacing with the smart card. The communication scheme used for interfacing between the smartcard and the electronic transaction terminal could as such be eighter contactless or using some form of physical connection (e.g., including a "cable" in between). Also the expression "transaction" should be understood to include any form of information passed between the electronic transaction terminal and the smart card. As such, a transaction may be one step in a process of performing a monetary transaction (such as paying for a product or service using the smart card). However, a transaction may also be defined as just exchanging information between the smart card and the electronic transaction terminal, such as in relation to signing a digital contract, in relation to an entry system, etc.

An advantage with the proposed multi-stage (multi-transaction) activation and fingerprint enrollment for the smart card is that there will not be any need for a specifically purposed electronic device for allowing the user to enroll one of a plurality of fingers with the (new) smart card. Rather, in accordance to the present disclosure it is possible to rely on the fact that the user is allowed to use the smart card even though the smart card is not ready to use the fingerprint sensing system for authenticating an individual transaction. In addition, the user will not have to spend tedious "extra time" for fingerprint enrollment, since the enrollment/fingerprint activation process is performed in the background.

Furthermore, in comparison to prior-art solutions for background enrollment of a smart card, the present scheme for enrolling the user and activating the smart card for fingerprint authentication allows for an increase security when enrolling a new smart card. Specifically, in line with the present disclosure an individual transaction is only authenticated when it has been determined that an authentication criterion is fulfilled, where the fulfillment of the authentication criterion comprises determining that the fingerprint template holds at least a predetermined number of sets of fingerprint features. That said, the present scheme further implements a feature to ensure that only correct sets of fingerprint features are stored with the fingerprint template. Accordingly, the smart card will only be made useful for fingerprint authentication once a sufficient number of "correct" fingerprint features are included with the fingerprint template.

However, in accordance to the present disclosure, it may not always be sufficient that the fingerprint template holds at least a predetermined number of sets of fingerprint features to allow fingerprint authentication to be activated. Rather, in accordance to the present disclosure it is also necessary for these sets of fingerprint features to sufficiently match each other. Thus, in line with the present disclosure a "cleaning process" is performed at the smart card, to remove/delete sets of fingerprint features not sufficiently matching the further sets of fingerprint features comprised with the fingerprint template. This cleaning process is performed by performing a mutual comparison between the sets of fingerprint features comprised with the fingerprint template (e.g. in some embodiments by determining how each set is matching all other sets of fingerprint features). In some embodiments the sets of fingerprint features may be arranged in "clusters". As such, a set of fingerprint features considered by the processing circuitry to not be related to any cluster will be considered an unwanted set of fingerprint features and thus deleted from the fingerprint template. Accordingly, the first predetermined threshold as defined above can relate to a specific cluster and must as such not be a "global threshold" that each of the sets of fingerprint features must be matched to.

Furthermore, the cleaning process ensures that unwanted fingerprints, such as form an incorrect person not being an owner of the smart card, are "cleaned" from the fingerprint template. Thus, even in case an incorrect person by mistake or deliberately intermediately "injects" his fingerprint features with the fingerprint template, those fingerprint features will be removed before fingerprint authentication is activated for the smart card.

In some embodiments of the present disclosure the first threshold is set to be between 70%-95%, meaning that a set of fingerprint features is considered to be matching if it at least matches by 70%-95%. An in comparison higher first threshold will result in a longer time until fingerprint authentication is activated. However, an in comparison low first threshold may result in a low security for the activation process.

Within the context of the present disclosure, the expression "fingerprint representation" (or fingerprint image) should be interpreted broadly and to include both a regular "visual image" of a fingerprint of a finger as well as a set of measurements relating to the finger when acquired using the fingerprint sensor. A plurality of fingerprint images may be subsequently acquired and fused together during a single session, where the resulting information is used as an input for determining the sets of features.

It should be understood that the fingerprint sensor preferably is a fingerprint touch sensor; however, the present disclosure may also be implemented using e.g. a swipe fingerprint sensor. The fingerprint sensor may be implemented using any kind of current or future fingerprint sensing principle, including for example capacitive, optical, or thermal sensing technology. However, at present capacitive sensing is most preferred. Both one and two-dimensional sensors are possible and within the scope of the present disclosure.

The expression "fingerprint authentication" should within the context of the present disclosure be understood to mean a situation where the user of the smart card may authenticate an individual transaction by placing his finger at the smart card's fingerprint sensor. That is, the user will in such an embodiment not be forced to also enter a PIN code at the electronic transaction terminal to validate a specific individual transaction.

The expression "processing circuitry" as used above should be understood to include any type of computing device, such as an ASIC, a micro-processor, etc. It should also be understood that the actual implementation of such a processing circuitry may be divided between more than a single device/circuit.

It may in accordance to the present disclosure be possible to expand the authentication criterion further, to further increase the security of the activation process.

Accordingly, in one embodiment of the present disclosure the fulfillment of the authentication criterion further comprises determining that at least a predetermined number of subsequently formed sets of fingerprint features relating to individual transactions each have a first similarity level that is above the first threshold level. That is, it may in some embodiments be preferred to continuously determine how well the present set of fingerprint features is matching sets of fingerprint features already comprised with the fingerprint template. Accordingly, this continuous matching determination may be used as part of the activation criterion for the smart card.

In a general implementation, it will be "harder" to achieve a matching in early use of the new smart card as compared to a situation where the smart card has been used to perform a couple of individual transaction.

The smart card may in one preferred embodiment be a hybrid smart card, implementing both of contactless and contact interfaces (electrical contact pads) on a single card. Accordingly, for achieving the contactless interface the smart card may further comprises a wireless transceiver for wireless communication with an electronic transaction terminal, such as for example the above-mentioned POS terminal. The wireless transceiver may for example be adapted for at least one of Bluetooth, Wi-Fi, Bluetooth, and NFC communication. The wireless functionality could possibly be limited to use only once the user has enrolled his fingerprint with the smart card, for example for payment purposes as is known within the technical area of the present disclosure.

In an embodiment, the smart card further comprises a user interface for informing the user that the authentication criterion has been fulfilled. The user interface provided with the smart card may in one embodiment be a light source, such as an LED integrated with a surface of the smart card, for example indicating an intermediate status within the enrollment/fingerprint activation process.

It may in one embodiment be possible to only perform the steps of acquiring, extracting and forming as long as a transaction session between the smart card and the electronic transaction terminal is maintained. Thus, the user may possibly be requested to keep the smart card a predetermined distance from the electronic transaction terminal for allowing a further step in the multi-step activation of fingerprint authentication to be performed. Such an implementation will of course provide further security to the activation process, reducing the risks with e.g. a hacker trying to falsely activate the fingerprint functionality for the smart card. The predetermined distance may in some embodiment of the invention for example be set based on an "NFC field" provided by the electronic transaction terminal and used by the smart card.

The enrollment process may in some embodiments of the present disclosure be allowed to be dynamically adjusted in the sense that the matching between the forming a present set of fingerprint features and the sets of previously extracted fingerprint features. That is, during e.g. the first few "runs" the similarity level may be matched to an in comparison lower first threshold, as compared to an increased first threshold used during a later stage of the enrollment process. Possibly, the first threshold may be dynamically (e.g. "slowly") increased for each or the sessions where further fingerprint data is captured by the fingerprint sensor. However, it should in this embodiment be understood that it in some situations may be desirable to include some additional security measures to ensure that so called "template poisoning" does not occur.

In an embodiment of the present disclosure, the smart card may be "locked" once the fingerprint authentication functionality has been completed. Accordingly, the smart card may in such an implementation not be allowed to be reconfigured for another user/finger. It should be understood that locking also may be done in case authentication attempts failed reaches an unacceptable level. However, it should be understood that the smart card still may be adapted for allowing an update of the fingerprint template to take place, even after enabling fingerprint authentication and possibly also if the smart card has been locked. Template update may for example be performed in case it is detected that the fingerprint pattern of (a rightful and authenticated) user has slightly changed. The template update is thereby used for "tracking" a change (such as a scar, etc.) in the fingerprint pattern of the user's finger.

According to second aspect of the present disclosure, there is provided a method for activating fingerprint authentication for a user of a smart card, the smart card comprising a fingerprint sensing system including a fingerprint sensor configured for capturing a fingerprint representation of a fingerprint pattern of a finger of the user, and processing circuitry connected to and configured to control the operation of the fingerprint sensing system, the method comprising the steps of acquiring, using the fingerprint sensor, a present fingerprint representation of a portion of the user's fingerprint, extracting, using the processing circuitry, present fingerprint features from the present fingerprint representation, forming a present set of fingerprint features, amending, using the processing circuitry, a fingerprint template stored at the smart card to comprise the present set of fingerprint features, determining, using the processing circuitry, a plurality of first similarity levels by mutually comparing the sets of fingerprint features comprised with the fingerprint template, and deleting, using the processing circuitry, the set or sets of fingerprint features having first similarity levels being below a first predetermined threshold.

This aspect of the present disclosure generally provides similar advantages as discussed above in relation to the first aspect of the present disclosure. That said, the second aspect of the present disclosure allows for the enrollment process to be performed completely autonomous, e.g., without the need to involve an electronic transaction terminal in the initiation of the enrollment of the user. Rather, in accordance to the second aspect of the present disclosure, the enrollment process could for example be initiated by connecting the smart card with a power source (e.g. a battery or similar energy supply) by pushing a button at the smart card, etc. It should be understood that the power source may be external the smart card or provided as a component of the smart card.

According to third aspect of the present disclosure, there is provided a smart card comprising a fingerprint sensing system including a fingerprint sensor configured for capturing a fingerprint representation of a fingerprint pattern of a finger of a user, and processing circuitry connected to and configured to control the operation of the fingerprint sensing system, wherein the smart card is adapted for transition between a fingerprint authentication inactive state and a fingerprint authentication active state, wherein the processing circuitry is adapted to receive an indication that the smart card is in contactless communication with an electronic transaction terminal, thereby initiating an individual transaction, acquire, using the fingerprint sensor, a present fingerprint representation of a portion of the user's fingerprint, extract present fingerprint features from the present fingerprint representation, forming a present set of fingerprint features, amend, using the processing circuitry, a fingerprint template stored at the smart card to comprise the present set of fingerprint features, determine, using the processing circuitry, a plurality of first similarity levels by mutually comparing the sets of fingerprint features comprised with the fingerprint template, delete, using the processing circuitry, the set or sets of fingerprint features having similarity levels below a first predetermined threshold, and authenticating, using the processing circuitry, the individual transaction only if an authentication criterion is fulfilled, the fulfillment of the authentication criterion comprises determining that the fingerprint template holds at least a predetermined number of sets of fingerprint features. This aspect of the present disclosure provides similar advantages as discussed above in relation to the previous aspects of the present disclosure.

In some embodiments the smart card forms part of a smart card system, further comprising the electronic transaction terminal and backend server arranged in network communication with the electronic transaction terminal, the backend server in part configured to handle the individual transactions.

According to a fourth aspect of the present disclosure there is provided another smart card system, the smart card system comprising a smart card comprising a fingerprint sensing system including a fingerprint sensor configured for capturing a fingerprint representation of a fingerprint pattern of a finger of a user, and processing circuitry connected to and configured to control the operation of the fingerprint sensing system, an electronic transaction terminal, and a backend server arranged in network communication with the electronic transaction terminal, the backend server in part configured to handle an individual transaction, wherein the processing circuitry comprised with the smart card is adapted to receive an indication that the smart card is in contactless communication with the electronic transaction terminal, thereby initiating the individual transaction, acquire, using the fingerprint sensor, a present fingerprint representation of a portion of the user's fingerprint, extract present fingerprint features from the present fingerprint representation, forming a present set of fingerprint features, determine a matching level between the present fingerprint features and a fingerprint template stored at the smart card, and authenticate the individual transaction if the matching level is above a predetermined matching threshold, wherein the backend server only accepts the fingerprint based smart card authenticated transaction if a predefined backend server condition has been fulfilled.

In accordance to this aspect of the present disclosure it is made possible to allow also the backend server to be involved in controlling when the fingerprint authentication is to be allowed. Such a control of when to allowing fingerprint authentication to be successfully used is typically based on a previous behavior of the user when using the smart card, specifically when using the smart card for performing an individual transaction but not using the fingerprint sensing system for authenticating the individual transaction.

In accordance to this aspect of the present disclosure the predefined backend server condition involves authenticating the individual transaction using e.g. a PIN code at the electronic transaction terminal, or by allowing the user to identify himself using an identity card.

Generally, it will likely be so that the predefined backend server condition is fulfilled before the authentication criterion (as has been discussed above) has been fulfilled, i.e. the PIN code authentication of the individual transaction will generally take place before the "fingerprint authentication criterion" has been completed. In line with the present disclosure it may however also be possible to further dictate the conditions for the predefined backend server condition. As an example, it may be demanded that the PIN code has been correctly entered in relation to a number of subsequent individual transaction. In one embodiment at least three subsequent individual transaction have to have been successfully authenticated using the PIN code before the backend server accepts the fingerprint based smart card authenticated transaction.

Advantages following this approach ensures that the operator of the backend server may be in control of the fingerprint authentication using the smart card. A such, in case the operator of the backend server makes a conclusion that the use of the smart card is somewhat not according to a normal usage, then further non-fingerprint based authentication may be needed before the fingerprint based authentication is allowed.

In a preferred embodiment both the predefined backend server condition and the authentication criterion have been fulfilled before the fingerprint based authentication finally is allowed by the backend server.

It should be stressed that the scheme according to the third aspect of the present disclosure may be used also with smart cards that apply fingerprint authentication but not necessarily follows the same approach as is presented in accordance to the first and second aspect for authenticate an the individual transaction using collected fingerprint features. As an example, the scheme according to the third aspect could as such be used with a fingerprint based smart card where the fingerprint template has been filled with sufficient fingerprint data using another method, such as by enrolling the user at an official location, such as a bank, etc.

In accordance to a fifth aspect of the present disclosure there is provided a computer program product comprising a non-transitory computer readable medium having stored thereon computer program means for multi-step activation of fingerprint authentication for a user of a smart card, the smart card comprising a fingerprint sensing system including a fingerprint sensor configured for capturing a fingerprint representation of a fingerprint pattern of a finger of a user, and processing circuitry connected to and configured to control the operation of the fingerprint sensing system, wherein the computer program product comprises code for receiving, at the processing circuitry, an indication that the smart card is in contactless communication with an electronic transaction terminal, thereby initiating an individual transaction, code for acquiring, using the fingerprint sensor, a present fingerprint representation of a portion of the user's fingerprint, code for extracting, using the processing circuitry, present fingerprint features from the present fingerprint representation, forming a present set of fingerprint features, code for amending, using the processing circuitry, a fingerprint template stored at the smart card to comprise the present set of fingerprint features, code for determining, using the processing circuitry, a plurality of first similarity levels by mutually comparing the sets of fingerprint features comprised with the fingerprint template, code for deleting, using the processing circuitry, the set or sets of fingerprint features having similarity levels below a first predetermined threshold, and code for authenticating, using the processing circuitry, the individual transaction only if an authentication criterion is fulfilled, the fulfillment of the authentication criterion comprises determining that the fingerprint template holds at least a predetermined number of sets of fingerprint features. Also this aspect of the present disclosure provides similar advantages as discussed above in relation to the first, second and the third aspects of the present disclosure.

In summary, the present disclosure relates to a method for progressively enrolling a user of a smart card, specifically applying a multi-step activation process for enabling fingerprint authentication for the smart card. The present disclosure also relates to a corresponding smart card and to a computer program product. The present disclosure provides a solution for seamless fingerprint enrollment for a smart card user.

Further features of, and advantages with, the present disclosure will become apparent when studying the appended claims and the following description. The skilled person realize that different features of the present disclosure may be combined to create embodiments other than those described in the following, without departing from the scope of the present disclosure.

BRIEF DESCRIPTION OF THE DRAWINGS

The various aspects of the present disclosure, including its particular features and advantages, will be readily understood from the following detailed description and the accompanying drawings, in which.

DETAILED DESCRIPTION

The present disclosure will now be described more fully hereinafter with reference to the accompanying drawings, in which currently preferred embodiments of the present disclosure are shown. This present disclosure may, however, be embodied in many different forms and should not be construed as limited to the embodiments set forth herein; rather, these embodiments are provided for thoroughness and completeness, and fully convey the scope of the present disclosure to the skilled person. Like reference characters refer to like elements throughout.

Figure 1:
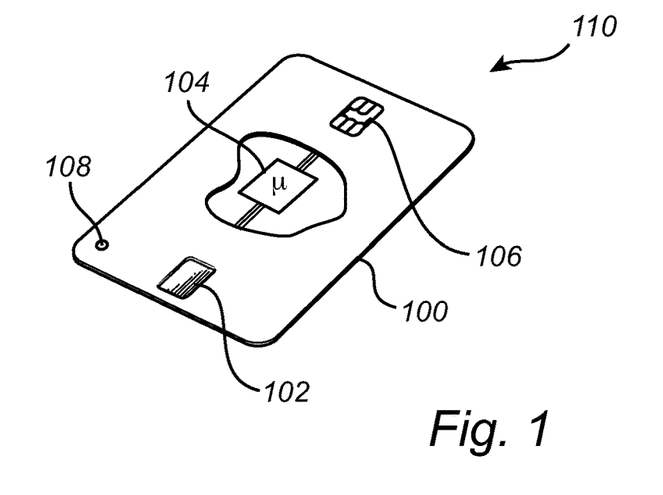
FIG. 1 schematically illustrates a smart card to be used in conjunction with the multi-step activation of fingerprint authentication as defined by the present disclosure, FIG. 2 conceptually shows user interaction with the smart card and a POS terminal for performing a transaction using the smart card, FIG. 3 exemplifies a detailed view of a fingerprint sensor integrated with the smart card of the present disclosure.
Figure 2:
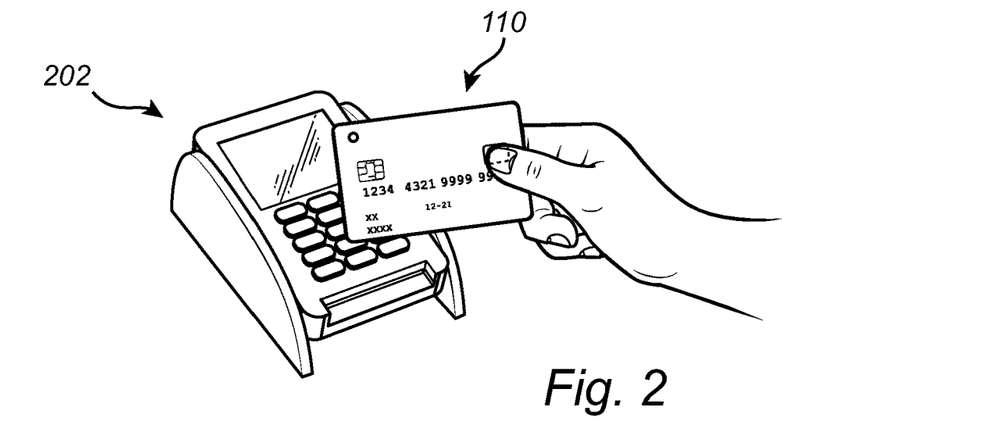

Turning now to the drawings and to FIGS. 1 and 2 in particular, there is schematically illustrated a smart card 100 integrating a fingerprint sensing system including a fingerprint sensor 102 including a plurality of sensing elements and configured for capturing a fingerprint representation of a fingerprint pattern of a finger of a user, as well as a processing circuitry 104 connected to and configured to control the operation of the fingerprint sensor 102. In this embodiment the fingerprint sensor 102 is arranged on the front side of the smart card 100. However, the fingerprint sensor 102 may as an alternative (or also) be provided on a back side of the smart card 100. The fingerprint sensor 102 may, for example, be used for authenticating the user when performing a payment/transaction, for example allowing the smart card 100, once the finger of the user has been enrolled, to interact with an electronic transaction terminal, such as POS terminal 202 (as seen in FIG. 2). Furthermore, the smart card 100 may integrate a plurality of contact pads 106 electrically connected to at least the processing circuitry 104, possibly allowing for providing a wired connection with the POS terminal 302 if/when the smart card 100 is inserted in a card slot provided with the POS terminal 302.

In addition, the smart card 100 may in some embodiments also include a user interface, such as for example a light source 108 (e.g. a light emitting diode, LED) integrated with the smart card 100 and arranged in electrical connection with the processing circuitry 104. Still further, the smart card carrier 100 preferably comprises means (not shown) for allowing wireless interaction with the POS terminal 202, such as adapted for allowing near field communication (NFC) between the smart card carrier 100 and the POS terminal 302. Accordingly, in using wireless communication the user need not insert the smart card 100 into the card slot of the POS terminal 202. The NFC connection between the smart card 100 and the POS terminal may further be used for providing electrical power to the smart card carrier 100, in a manner known to the skilled person.

The processing circuitry 104 further comprises a memory, such as a database, e.g. for storing one or a plurality of fingerprint template for one or a plurality of fingers for the user. The processing circuitry 104 may each include a microprocessor, microcontroller, programmable digital signal processor or another programmable device. The processing circuitry 104 may also, or instead, each include an application specific integrated circuit, a programmable gate array or programmable array logic, a programmable logic device, or a digital signal processor. Where the processing circuitry 104 includes a programmable device such as the microprocessor, microcontroller or programmable digital signal processor mentioned above, the processor may further include computer executable code that controls operation of the programmable device. It should be understood that all or some parts of the functionality provided by means of the processing circuitry 104 (or generally discussed as "processing circuitry") may be at least partly integrated with the fingerprint sensor 102.

It should be understood that the POS terminal 202 generally is connected with a backend server (not shown) using a network connection (such as possibly involving the Internet), where the backend server at least in part is configured to handle an individual transaction.

Figure 3:
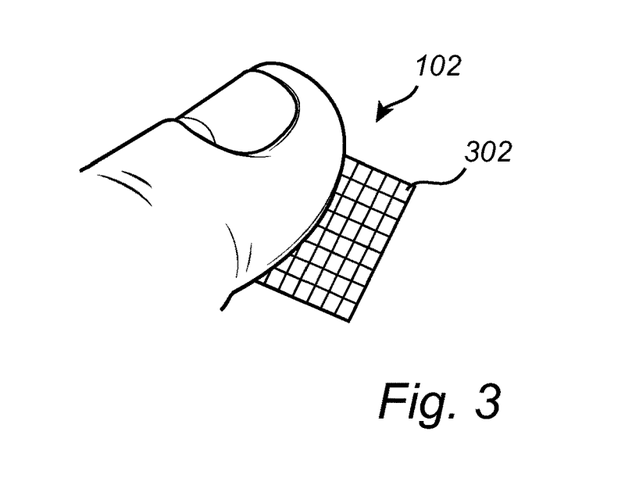

With further reference to FIG. 3, there is conceptually illustrated a somewhat enlarged view of the fingerprint sensor 102. In the case of employing a capacitive sensing technology, the fingerprint sensor 102 is configured to comprise a large plurality of sensing elements, preferably arranged as a two-dimensional array. The two-dimensional array may have sizes depending on the planned implementation and in an embodiment 160×160 pixels are used. Other sizes are of course possible and within the scope of the present disclosure, including two-dimensional array with less pixels as compared to the above example. A single sensing element (also denoted as a pixel) is in FIG. 3 indicated by reference numeral 302.

Figure 4:
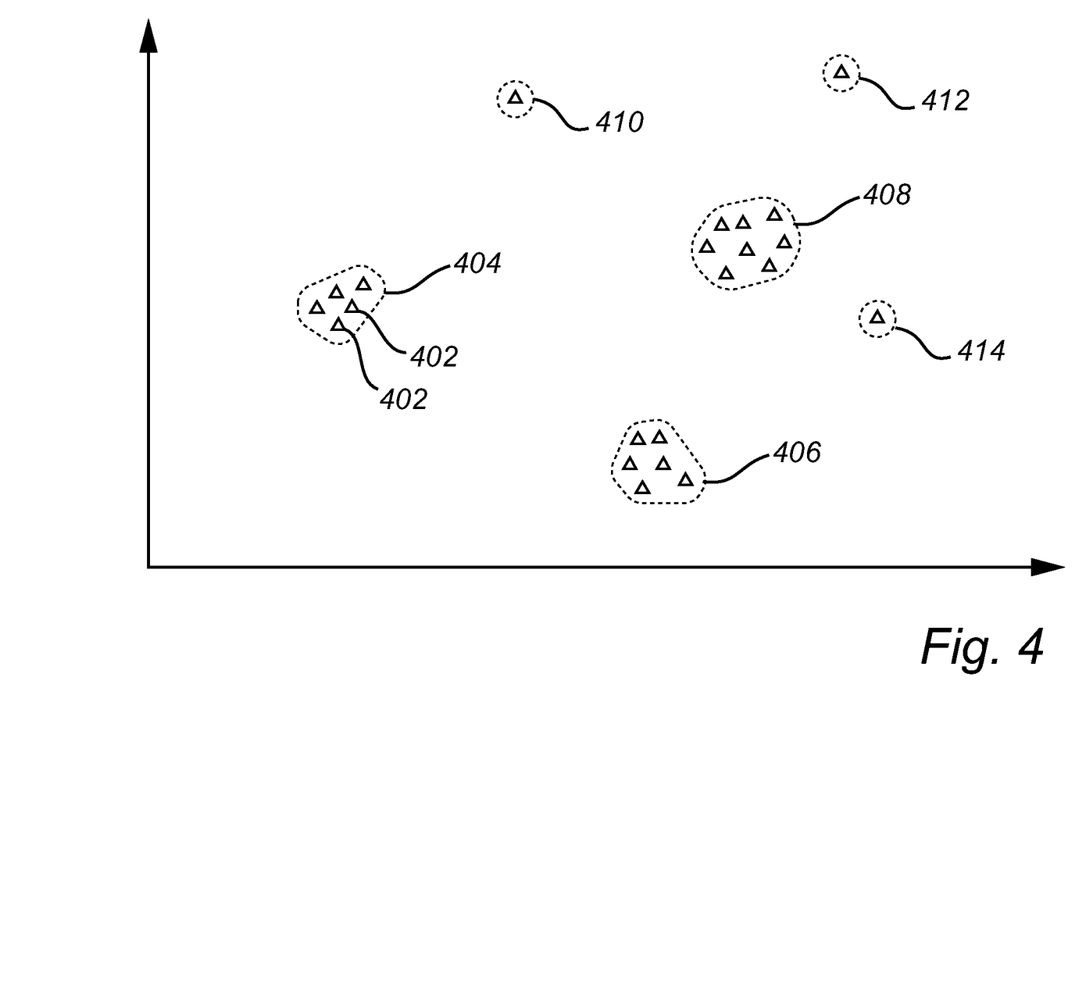
FIG. 4 presents an exemplary two-dimensional illustration of how to identify non-valid sets of fingerprint features intermediately comprised with the fingerprint template, and FIG. 5 provides a flowchart illustrating the exemplary steps of the present disclosure for enabling fingerprint authentication of a user with a smart card.
Figure 5:
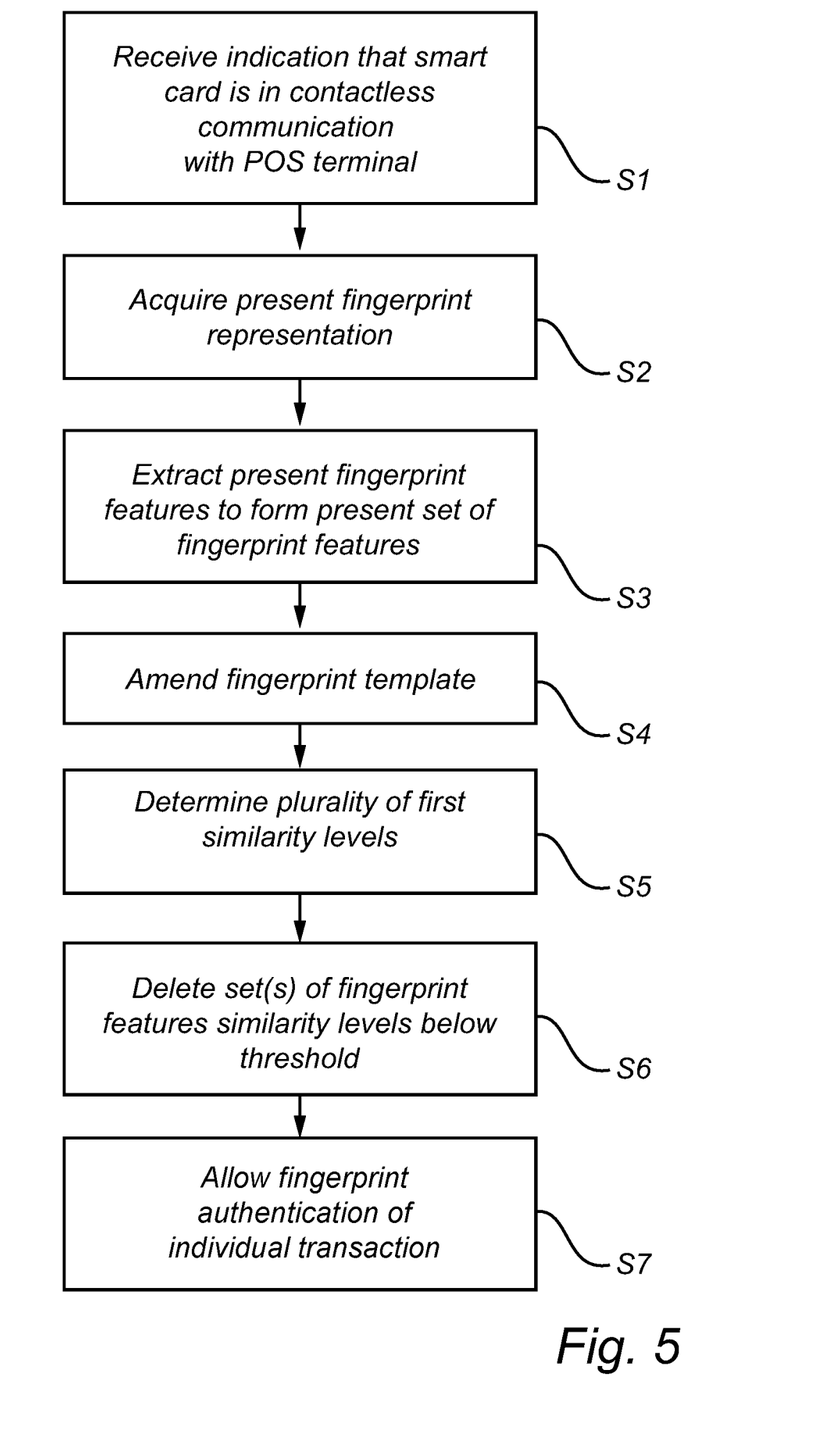

Turning now to FIG. 4 in conjunction with FIG. 5, elaborating around the process of enrolling the user and activating fingerprint authentication of the smart card 100 as shown in FIG. 2, including removing unwanted sets of fingerprint features that have been injected into a fingerprint template stored at the smart card 100.

The process starts for example when the user is at an establishment, such as a restaurant, grocery store, or similar, and is to make a payment using his smart card 100. The user positions the smart card 100 in a vicinity of the POS terminal 202 to establish a contactless communication between the smart card 100 and the POS terminal 202.

The processing circuitry 104 of the smart card 100 receives, S1, an indication about the established communication with the POS terminal 202 and initiate an individual transaction. In conjunction with the individual transaction the processing circuitry 104 will control the fingerprint sensors 102 to acquire, S2, a present fingerprint representation of a portion of the user's fingerprint. The present fingerprint representation may take different forms dependent on the technology implemented used for implementing the fingerprint sensor 102. Generally, the fingerprint representation may be seen as a "fingerprint image", corresponding to at least a portion of the total fingerprint of the user.

The processing circuitry 104 will subsequently extract, S3, present fingerprint features from the present fingerprint representation to form a present set of fingerprint features. The fingerprint features extracted from the present fingerprint representation may for example, depending on technology used for the fingerprint sensor 102, comprise minutiae and pores information, as well as information about the positional relationship between the fingerprint features.

Once a new set of fingerprint features have been extracted, this set is amended, S4, to a fingerprint template stored at the smart card 100, such as with the memory provided in relation to the processing circuitry 104.

It should be understood that it may be possible to implement further security features when the fingerprint template of the smart card 100 is completely empty, i.e. when the smart card 100 is completely new and just received by the user. Such further security measures may for example include the use of a one-time PIN used by the user when the user is to start using the fingerprint sensor 102.

In line with the present disclosure, and as specifically exemplified in FIG. 4, all of the sets of fingerprint features comprised with the fingerprint template may not in the end be used for a future fingerprint authentication of the user. Rather, in accordance to the present disclosure a "cleaning process" is performed to identify and remove unwanted sets of fingerprint features. A first step in this cleaning process is to arrange the processing circuitry to determine, S5, a plurality of first similarity levels by mutually comparing the sets of fingerprint features comprised with the fingerprint template. FIG. 4 illustrate, in a greatly simplified manner, a two-dimensional distribution of the sets of fingerprint features 402 initially comprised with the fingerprint template. As may be see, the fingerprint features 402 are "clustered", meaning that not all of the sets of fingerprint features will be located in close conjunction with each other. In FIG. 4, three separate clusters 404, 406 and 408 are shown, where each of the cluster 404, 406 and 408 comprises a plurality of sets of fingerprint features As is understood from visiting FIG. 4, the mutual distance between the sets of fingerprint features within a specific cluster is small, while at the same time the distance between a specific set of fingerprint features located in one cluster (e.g. cluster 404) and another set of fingerprint features in another cluster (e.g. cluster 406) may in comparison be larger.

As will also be understood from FIG. 4, some sets of fingerprint features may not necessarily be determined to have matching relation to other sets of fingerprint features. In FIG. 4, three sets of fingerprint features, 410, 412, 414 are here seen to be unrelated to the cluster 404, 406 and 408. In line with the present disclosure, these sets of fingerprint features, 410, 412, 414 will by the processing circuitry be determined to have a similarity level that is considered to be below a predetermined threshold and will accordingly be deleted, S6, from the fingerprint template Once the fingerprint template has been cleaned, it is possible to successfully authenticate, S7, an individual transaction using fingerprint authentication, meaning that the user does not have to enter his PIN code every time a transaction is to be performed. However, in accordance to the present disclosure, it will not be enough to just have a clean fingerprint template, the fingerprint template must at least include a sufficient amount of information for considering an activation criterion to be fulfilled. That said, once the authentication criterion is fulfilled, fingerprint authentication may be used for authentication the individual transaction.

To introduce further constrains to the expanded activation criterion, it may in addition to the above be possible to also continuously determine how well the present set of fingerprint features is matching sets of fingerprint features already comprised with the fingerprint template. If for example three to five consecutive individual transactions are performed, and the present set of fingerprint features formed for each of these three to five individual transactions are considered to sufficiently match the fingerprint template, then also the further expanded authentication criterion may be considered fulfilled, and fingerprint authentication made possible using the smart card 100.

In accordance to the present disclosure it is however preferred (but not in the broadest sense necessary) to even further expand the constrain for when to allow the use of fingerprint authentication of an individual transaction, to ensure that the security when using fingerprint authentication of an individual transaction complies with also a predefined backend server condition. In a preferred implementation of the present disclosure it is possible to adapt the predefined backend server condition to be based on a sequence of previously successfully authenticated individual transactions using the smart card, but not using the fingerprint sensing system for authenticating the transaction.

Rather, in such an embodiment fingerprint authentication may only be successful, when seen from a backend server perspective, in case a credential separate from the fingerprint has been used for authenticating the transaction. Such a separate credential may for example be a PIN code provided by the user at the POS terminal 202.

In some embodiments of the present disclosure it may be possible to define the predefined backend server condition to include the successful authentication of a plurality of individual transactions using the users PIN code. The backend server (or possibly the POS terminal 2020) may log the validity of PIN codes entered by the user. As such, if it has been considered that the user has correctly entered his PIN code for e.g. five to 10 consecutive individual transactions (and related acquisition of fingerprint representations), this may be seen as a state where the predefined backend server condition has been fulfilled.

Generally, if balancing the predefined backend server condition is balanced well with the authentication criterion the user will not notice that there in fact are two different conditions/criterion that has to be fulfilled before fingerprint authentication of an individual transaction is allowed. The predefined backend server condition will generally be fulfilled while the user (in the background) is enrolling his finger with the smart card 100.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the present disclosure has been described with reference to specific exemplifying embodiments thereof, many different alterations, modifications and the like will become apparent for those skilled in the art.

In addition, variations to the disclosed embodiments can be understood and effected by the skilled addressee in practicing the claimed present disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method for activating fingerprint authentication for a user of a smart card, the smart card comprising a fingerprint sensing system including a fingerprint sensor configured for capturing a fingerprint representation of a fingerprint pattern of a finger of the user, and processing circuitry connected to and configured to control the operation of the fingerprint sensing system, the method comprising the steps of:
receiving, at the processing circuitry, an indication that the smart card is in communication with an electronic transaction terminal, thereby initiating an individual transaction,
acquiring, using the fingerprint sensor, a present fingerprint representation of a portion of the user's fingerprint,
extracting, using the processing circuitry, present fingerprint features from the present fingerprint representation, forming a present set of fingerprint features,
amending, using the processing circuitry, a fingerprint template stored at the smart card to comprise the present set of fingerprint features, the amended fingerprint template comprising a plurality of sets of fingerprint features, the plurality of sets of fingerprint features including the present set of fingerprint features,
determining, using the processing circuitry, a plurality of first similarity levels by mutually comparing the plurality of sets of fingerprint features comprised with the amended fingerprint template, wherein mutually comparing the plurality of sets of fingerprint features comprises arranging the plurality of sets of fingerprint features in one or more clusters,
deleting, using the processing circuitry, any set of fingerprint features of the plurality of sets of fingerprint features in the amended fingerprint template having a respective first similarity level below a first predetermined threshold to obtain an updated fingerprint template, wherein the first similarity levels are based on the one or more clusters, and
authenticating, using the processing circuitry, the individual transaction only when an authentication criterion is fulfilled, the fulfillment of the authentication criterion comprises determining that the updated fingerprint template holds at least a predetermined number of sets of fingerprint features.

2. The method according to claim 1, wherein the fulfillment of the authentication criterion further comprises determining that at least a predetermined number of subsequently formed sets of fingerprint features relating to individual transactions each have a respective first similarity level that is above the first threshold level.

3. The method according to claim 2, wherein the predetermined number of subsequently formed sets of fingerprint features include at least three subsequently formed sets of fingerprint features.

4. The method according to claim 1, wherein the smart card further comprises a wireless transceiver for wireless communication with the electronic transaction terminal.

5. The method according to claim 1, wherein the transaction session is maintained if the smart card is positioned within a predetermined distance from the electronic transaction terminal.

6. The method according to claim 1, wherein the communication is contactless and is based on near field communication (NFC).

7. The method according to claim 1, wherein the transaction session is maintained if the smart card is positioned within a predetermined distance from the electronic transaction terminal, wherein the communication is contactless and is based on near field communication (NFC), and wherein the predetermined distance is based on a wireless communication distance for NFC.

8. A method for activating fingerprint authentication for a user of a smart card, the smart card comprising a fingerprint sensing system including a fingerprint sensor configured for capturing a fingerprint representation of a fingerprint pattern of a finger of the user, and processing circuitry connected to and configured to control the operation of the fingerprint sensing system, the method comprising the steps of:
acquiring, using the fingerprint sensor, a present fingerprint representation of a portion of the user's fingerprint,
extracting, using the processing circuitry, present fingerprint features from the present fingerprint representation, forming a present set of fingerprint features,
amending, using the processing circuitry, a fingerprint template stored at the smart card to comprise the present set of fingerprint features, the amended fingerprint template comprising a plurality of sets of fingerprint features, the plurality of sets of fingerprint features including the present set of fingerprint features,
determining, using the processing circuitry, a plurality of first similarity levels by mutually comparing the plurality of sets of fingerprint features comprised with the amended fingerprint template, wherein mutually comparing the plurality of sets of fingerprint features comprises arranging the plurality of sets of fingerprint features in one or more clusters, and
deleting, using the processing circuitry, any set of fingerprint features of the plurality of sets of fingerprint features in the amended fingerprint template having a respective first similarity level below a first predetermined threshold to obtain an updated fingerprint template, wherein the first similarity levels are based on the one or more clusters.

9. A smart card comprising a fingerprint sensing system including a fingerprint sensor configured for capturing a fingerprint representation of a fingerprint pattern of a finger of a user, and processing circuitry connected to and configured to control the operation of the fingerprint sensing system, wherein the smart card is adapted for transition between a fingerprint authentication inactive state and a fingerprint authentication active state, wherein the processing circuitry is adapted to:

receive an indication that the smart card is in contactless communication with an electronic transaction terminal, thereby initiating an individual transaction, acquire, using the fingerprint sensor, a present fingerprint representation of a portion of the user's fingerprint, extract present fingerprint features from the present fingerprint representation, forming a present set of fingerprint features, amend, using the processing circuitry, a fingerprint template stored at the smart card to comprise the present set of fingerprint features, the amended fingerprint template comprising a plurality of sets of fingerprint features, the plurality of sets of fingerprint features including the present set of fingerprint features, determine, using the processing circuitry, a plurality of first similarity levels by mutually comparing the plurality of sets of fingerprint features comprised with the amended fingerprint template, wherein mutually comparing the plurality of sets of fingerprint features comprises arranging the plurality of sets of fingerprint features in one or more clusters delete, using the processing circuitry, any set of fingerprint features of the plurality of sets of fingerprint features in the amended fingerprint template having a respective first similarity level below a first predetermined threshold to obtain an updated fingerprint template, wherein the first similarity levels are based on the one or more clusters, and authenticate, using the processing circuitry, the individual transaction only when an authentication criterion is fulfilled, the fulfillment of the authentication criterion comprises determining that the updated fingerprint template holds at least a predetermined number of sets of fingerprint features.

10. The smart card according to claim 9, wherein the fulfillment of the authentication criterion further comprises determining that at least a predetermined number of subsequently formed sets of fingerprint features relating to individual transactions each have a respective first similarity level that is above the first threshold level.

11. The smart card according to claim 9, wherein the processing circuitry is integrated with the fingerprint sensing system.

12. The smart card according to claim 9, wherein the fingerprint sensor is a capacitive fingerprint sensor.

13. The smart card according to claim 9, further comprising a wireless transceiver for wireless communication with an electronic transaction terminal.

14. A smart card system, comprising:
a smart card according to claim 9,
an electronic transaction terminal, and
a backend server arranged in network communication with the electronic transaction terminal, the backend server in part configured to handle the individual transactions.

* * * * *